United States Patent [19]

Sliney

[11] Patent Number: 5,290,637
[45] Date of Patent: Mar. 1, 1994

[54] COMPOSITE METALLIC ARMOR

[75] Inventor: Joseph L. Sliney, Watertown, Mass.

[73] Assignee: The United States of America as represented by the Secretary of the Army, Washington, D.C.

[21] Appl. No.: 510,158

[22] Filed: Nov. 23, 1965

[51] Int. Cl.⁵ .............................................. B22F 7/04
[52] U.S. Cl. ................................... 428/548; 428/564; 428/217; 428/911; 428/610
[58] Field of Search ................... 29/194, 196.1, 182.2; 428/610, 548

[56] References Cited

U.S. PATENT DOCUMENTS

| | | | |
|---|---|---|---|
| 300,730 | 6/1884 | Pedder . | |
| 397,928 | 2/1889 | Melaney . | |
| 2,249,629 | 6/1941 | Hopkins | 148/31 |
| 2,372,607 | 3/1945 | Schwartzkopf | 29/189 |
| 2,391,353 | 12/1945 | Sheridan | 109/85 |
| 2,474,682 | 6/1949 | Liebowitz | 29/196.1 |

Primary Examiner—Donald P. Walsh
Assistant Examiner—John N. Greaves
Attorney, Agent, or Firm—Saul Elbaum; Muzio B. Roberto

[57] ABSTRACT

This invention relates to an improved ballistic metallic armor and a method of producing same. The object of this invention is accomplished by utilizing composite metallic materials made up of two but preferably three or more layers of different metals or alloys. The arrangement of the layers are made so that the front face is a hard brittle material (Rockwell C-60) designed to shatter the steel penetrator and the hardness of the layers should decrease from front to back.

3 Claims, No Drawings

COMPOSITE METALLIC ARMOR

This invention relates to an improved ballistic metallic armor and a method of processing same.

The object of this invention is the protection by metallic armor which provides increased ballistic protection with a significant reduction in weight over standard steel armor of equal area density.

This object is accomplished by utilizing composite metallic materials made up of two but preferably three or more layers of different metals or alloys.

Steel armor classified as rolled homogeneous armor, MIL-A-12560B, Jul. 31, 1962 (¼" to 6") has not been materially upgraded ballistically since 1945. Many metallurgical advances have been evaluated as potential methods for improving ballistic performances however none have been considered successful by themselves.

two or more layers. The overall design of such a composite is to use as many layers as possible with a goal of obtaining a maximum total average of hardness without brittle fracture.

As an example of forming such a composite, a Hy TEN - m a 0.70C, 1-nickel steel was employed as the front face, 9Ni-4Co-0.45C as the intermediate layer and 9Ni-4Co-0.30C as the rear layer or base plate. Each plate of ½" thickness was blanchard ground on all six surfaces, seam welded with an Electron Beam welder, hot rolled from 2100° F. in the original thickness direction for a reduction of 40%, the composite was turned and cross-rolled to final gage which represented an overall reduction in the thickness of 60%.

Tests were made on a composite using just the first two layers and also using all three layers as previously outlined, both being given the same treatment, with the following results:

| Composite | Thickness (inches) | Protection $V_{50}$ Ballistic Limit ft./sec. | Area Density lbs./sq. ft. | Area Density and Steel Armor - same ballistic protection | Percent weight savings |
|---|---|---|---|---|---|
| Dual Hardness | .260 | 2395 | 10.6 | 18.7 | 43.2 |
| Dual Hardness | .288 | 2500 | 11.8 | 20.0 | 41.0 |
| Tri Hardness | .260 | 2300 | 10.6 | 17.5 | 39.5 |
| Tri Hardness | .270 | 2370 | 11.0 | 18.4 | 39.0 |

The following weights of homogeneous steel are presently required for protection against various armor piercing projectiles:

| Projectile | Area Density to Protect at 100 yds. - lbs./ft.$^2$ (Normal Impact) |
|---|---|
| Caliber .30 AP m2 | 22 |
| Caliber .50 AP m2 | 47 |
| 20 mm m95 | 51 |
| 37 mm m51 B2 | 127 |
| 51 mm M70 | 218 |
| 3" APC M62 | 208 |
| 90 mm m82 | 282 |

Steel laminates have been made by heat treating to strength, cold worked to strength and ausformed to strength, but hot cold working and ausformling are not feasible for thickness greater than ½" to ¾". It has been found that to attain the protection desired that thicker plates must be used which increases the problems of fabrication.

To avoid the aforementioned difficultiesy it has been found that by employing two or preferably three or more layers of different materials metallurgically bonded together, the several layers and heat treating to strength, the result is a metallic armor affording a marked reduction in weight and possessing an equal improvement in ballistic protection. The arrangement of the layers should be made so that the front face is a hard brittle material (Rockwell C-60) designed to shatter the steel penetrator and the hardness of the layers should decrease from front to back.

In the formation of this composite using for example three layers of metals, the layers are metallurgically bonded together to restrain lateral movement of the hard brittle front face with respect to the more ductile layers beneath.

The bottom layer of even more ductile material acts as a base plate for additional ballistic protection or safety factor and also provides the important advantage that the front face does not crack when supported by These results show that the use of the dual and tri hardness laminates provide equal ballistic protection and as compared to standard steel armor with equal ballistic protection, there is afforded a weight saving of 39–43.2%. On the other hand, if standard steel armor of the same area density as the laminates is employed, the composites show an increased ballistic protection of 40–45% at the equal weights.

Photographs of the dual and tri-laminates when tested with various projectiles show face cracking in the dual laminate and the absence of face cracking in the tri-laminates, which indicates the superiority of using three or more layers.

The composites of this invention have application in both aircraft armor and vehicular armor. Dual hardness ausformed armor has application up to ¾" thickness but even within this limit severe secondary fabrication problems exist, while dual and tri hardness armor, heat treated to strength, significantly reduces secondary fabrication problems. Further, there is no limit to the number of layers and the maximum thicknesss so these laminates would also have application as armor for tanks.

These armor composites can be varied in total thickness, layer thickness, hardness of each layer and alloy selection to provide maximum protection against the various threat levels. Other types of bonding techniques may be employed, such as explosive bonding, as alternate means of fabrication. In addition, high strength titanium to low strength titanium steel to titanium or aluminum and titanium to aluminum are other composites that found suitable.

It will be apparent that many variations, modifications and extension of the principle applied in the specific examples, may readily be made. Accordingly all such variations, modifications and extensions are to be limited only by the scope of the appended claims.

What is claimed is:

1. A composite metallic armor comprising three layers of different alloys roll-bonded together to form a composite armor having a front face of 0.70 carbon, 1 nickel steel to shatter a projectile, an intermediate layer of 9 nickel - 4 cobalt - 0.45 carbon to reinforce the front face and a back layer of 9 nickel - 4 cobalt - 0.30 carbon to prevent cracking of front face, said composite armor being approximately 40% lighter when affording equal ballister protection as standard steel armor and providing 40-45% greater protection when the area density is the same as standard steel armor.

2. A composite metallic armor comprising at least three layers of different metal roll-bonded together to prevent lateralmovement between layers to forma composite armor increasing in dictility from front to back approximately 40% lighter when affording equal ballistic protection as standard steel armor and providing 40-45% greater protection when the area density is the same as standard steel armor.

3. A composite metallic armor comprising at least three layers of different metals roll-bonded together to prevent lateral movement between the layers to form a composite armor having a hard front face to shatter a projectile, an intermediate layer of a lighter and more ductile metal to reinforce the front face and a back layer of even more ductile metal to avoid cracking of the front face with the composite approximately 40% lighter when affording equal ballistic protection as standard steel armor and providing 40-45% greater protection when the area density is the same as standard steel armor.

* * * * *